United States Patent
Pelrine et al.

[11] Patent Number: 6,139,723
[45] Date of Patent: *Oct. 31, 2000

[54] IRON-BASED IONIC LIQUID CATALYSTS FOR HYDROPROCESSING CARBONACEOUS FEEDS

[75] Inventors: Bruce P. Pelrine, Ewing, N.J.; Alfred G. Comolli, Yardley, Pa.; Lap-Keung Lee, Cranbury, N.J.

[73] Assignee: Hydrocarbon Technologies, Inc., Lawrenceville, N.J.

[ * ] Notice: This patent is subject to a terminal disclaimer.

[21] Appl. No.: 09/238,310

[22] Filed: Jan. 28, 1999

Related U.S. Application Data

[63] Continuation-in-part of application No. 08/742,541, Nov. 1, 1996, Pat. No. 5,871,638, which is a continuation-in-part of application No. 08/609,759, Feb. 23, 1996, Pat. No. 5,866,501.

[51] Int. Cl.[7] .............................. C10G 1/06; B01J 23/84
[52] U.S. Cl. ..................... 208/422; 208/112; 208/143; 201/2.5; 201/25; 585/241; 502/217; 502/313; 502/339
[58] Field of Search ...................... 208/422, 112, 208/143; 585/241, 240; 201/2.5, 25; 502/217, 313, 317

[56] References Cited

U.S. PATENT DOCUMENTS

| | | | |
|---|---|---|---|
| 4,485,008 | 11/1984 | Maca et al. | 208/10 |
| 4,495,055 | 1/1985 | Comolli et al. | 208/8 LE |

*Primary Examiner*—Bekir L. Yildirim
*Attorney, Agent, or Firm*—Fred A. Wilson, Agent

[57] ABSTRACT

A highly dispersed iron-based ionic liquid or liquid-gel catalyst which may be anion-modified and metals-promoted has high catalytic activity, and is useful for hydrocracking/hydrogenation reactions for carbonaceous feed materials. The catalyst is produced by aqueous precipitation from saturated iron salt solutions such as ferric sulfate and ferric alum, and may be modified during preparation with anionic sulfate ($SO_4^{2-}$) and promoted with small percentages of at least one active metal such as cobalt, molybdenum, palladium, platinum, nickel, or tungsten or mixtures thereof. The resulting catalyst may be used in a preferred ionic liquid form or in a liquid-gel form, and either fluidic form can be easily mixed and reacted with carbonaceous feed materials such as coal, heavy petroleum fractions, mixed plastic waste, or mixtures thereof. The invention includes methods for making the ionic liquid or liquid-gel catalyst, and processes for using the fluidic catalysts for hydroprocessing the carbonaceous feed materials to produce desirable low-boiling hydrocarbon liquid products.

26 Claims, 3 Drawing Sheets

IRON-BASED IONIC LIQUID CATALYSTS FOR HYDROPROCESSING CARBONACEOUS FEEDS

This is a continuation-in-part application of Ser. No. 08/742,541 filed Nov. 1, 1996 now U.S. Pat. No. 5,871,638, which was a continuation-in-part application of Ser. No. 08/609,759, filed Feb. 23, 1996 and now U.S. Pat. No. 5,866,501.

BACKGROUND OF INVENTION

This invention pertains to iron-based ionic liquid or liquid-gel type catalysts having high catalytic activity for hydrocarbon hydroprocessing reactions. It pertains particularly to such iron based ionic liquid or liquid-gel catalysts which are synthesized from aqueous solutions of iron salts in presence of anions such as sulfate ($SO_4^{2-}$), and are usually promoted by small amounts of a suitable promotor metal for hydrocracking/hydrogenation reactions. Such iron-based ionic liquid or liquid-gel catalysts are useful in hydroprocessing of carbonaceous feed materials such as coal, heavy petroleum residua, and other high molecular weight hydrocarbons such as plastic waste to produce desirable, low-boiling value-added hydrocarbon liquid products.

The use of various iron-containing compounds such as pyrites ($FeS_2$) and red mud ($Fe_2O_3$) as catalysts for coal hydrogenation and liquefaction processes has been well known for many years. Such particulate iron catalyst compounds were usually added in small amounts to a coal-oil slurry feedstream upstream of a reactor operated at elevated temperature and pressure conditions. However, because of the generally low effectiveness of such known catalytic compounds primarily due to their low initial surface areas and inability to provide high levels of dispersion (number of catalyst particles per unit reacting volume) under reaction conditions, catalytic hydroconversion processes for coal and heavy petroleum resid feedstocks which have been developed during the past 30 years have often utilized particulate supported type catalysts. Such supported catalysts may be beads or extrudates containing small amounts of one or more active promotor metals such as cobalt, molybdenum or nickel deposited on an inert support material such as alumina or silica. Some examples of such particulate supported type catalysts are disclosed by U.S. Pat. No. 3,630,888 to Alpert et al; U.S. Pat. No. 4,294,685 to Kim et al; and U.S. Pat. No. 4,424,109 to Huibers et al. Such supported catalysts are used in either downflow fixed bed reactors or in upflow ebullated bed reactors maintained at desired reaction conditions of temperature, pressure and space velocity.

Although such particulate supported type catalysts such as cobalt-molybdenum or nickel-molybdenum deposited on alumina or silica support and catalytic hydroconversion processes using the supported catalysts have provided good results for hydrogenation and hydroconversion of coal and heavy oil feed materials, some disadvantages of such particulate supported type catalysts are their relatively poor contact with the feed materials and their rapid deactivation caused by deposition on the catalyst of coke and metal contaminants such as iron, titanium, nickel and vanadium contained in the feeds. Also, U.S. Pat. No. 4,136,013 to Moll et al discloses an emulsion type metal catalyst useful for hydrogenation processes, but it also has disadvantages of low catalytic activity and high catalyst usage. At the levels of catalyst usage disclosed in the Moll et al. patent, the catalyst cost becomes prohibitive unless the catalyst is recovered from the unconverted feed material and reused.

U.S. Pat. Nos. 4,077,867 and 4,134,825 to Bearden et al. disclose an in-situ formed metal-carbon containing dispersed slurry catalyst called 'M-Coke' for hydroconversion of coal, heavy oil, and mixtures thereof. The catalysts of Bearden et al. are primarily based on molybdenum which is significantly more expensive than iron, and disposal of used molybdenum catalysts is not environmentally as benign as that of used iron catalyst. U.S. Pat. No. 4,486, 293 to Garg disclosed a co-catalyst combination of iron and Group VI or VIII non-ferrous metal for liquefaction of coal in hydrogen-donor solvent using water soluble salts of the co-catalyst metals, with the catalyst being impregnated on the coal prior to the liquefaction reaction. U.S. Pat. No. 5,168,088 to Utz et al. discloses a unique way of improving the slurry catalyst dispersed during coal liquefaction by precipitating the iron oxide onto the coal matrix. But it is believed that deposition by such precipitation of the entire coal feed with catalyst would be very expensive for a commercial scale of operations.

V. Pradhan et al. disclosed in "Catalysis in Direct Coal Liquefaction by Sulfated Metal Oxides" Energy and Fuels, 1991, Vol. 5, various dispersed catalysts which have been found useful in coal liquefaction processes, including sulfated transition metal oxides such as sulfated iron oxides ($Fe2O_3/SO4$) and sulfated tin oxides ($SnO_2/SO_4$), in which the role of added anion ($SO_4^{-2}$) was attributed to the prevention of catalyst sintering or agglomeration under coal liquefaction conditions. However, further improvements are needed in catalyst compositions and forms for hydroprocessing of various carbonaceous feedstocks, particularly for dispersed iron-based catalysts that are highly active, environmentally benign and less expensive for the catalytic hydrocracking/hydrogenation processes in which they are used.

SUMMARY OF INVENTION

This invention provides iron-based ionic liquid or liquid-gel catalysts which are synthesized from aqueous solutions of iron salts and promoted with small percentages of at least one active promotor metal such as cobalt, molybdenum, palladium, platinum, nickel or tungsten or combinations thereof, and have high catalytic activity for improved hydrocracking and hydrogenation of various carbonaceous feedstocks. Such iron-based ionic liquid or liquid-gel catalysts may be formed of hydroxides or oxyhydroxides of iron, and may be synthesized by aqueous reaction from salt solutions in the presence of anions, such as sulfate ($SO_4^{2-}$) anion and may also be promoted by addition of small concentration of the promotor metal(s) in aqueous solution to produce the catalyst, which can be highly dispersed in a hydrocarbon liquid slurry feedstream. The aqueous preparation of the primary iron-based catalyst from the salt solutions is conducted in the presence of the anions in the solution to produce the ionic liquid or liquid-gel catalyst forms having high catalytic activity and a pH range of about 0.1–3.0.

Although this catalyst is preferably made and used in an ionic liquid form, the catalyst may contain some iron in a liquid-gel form, with such liquid-gel being defined as containing dispersed submicroscopic particle groups which retain water in their interstices. The liquid-gel catalyst is formed by the addition of an appropriate volume percentage of ammonium hydroxide solution to the iron salt aqueous solution. It is pointed out that for the preferred ionic liquid catalyst form, none or only a minimal amount of ammonium hydroxide solution is added to the aqueous iron salt solution. Iron-based salts which are useful for making this ionic liquid or liquid-gel catalyst include but are not limited to iron bromide, iron chloride, iron dichromate, iron iodide, iron oxalate, iron nitrate, iron thiosulfate and iron sulfate, with iron sulfate usually being preferred. The broad useful concentration of iron in the final ionic liquid or liquid-gel catalyst is 5–20 wt. %, and preferably is 8–16 wt. % iron. The concentration of the promotor metal is in a broad useful range of 0.05–2 wt. %, with 0.10–1.5 wt. % molybdenum promotor usually being preferred. Small amounts such as 0.2–2.0 wt. % of phosphoric acid may also be added to increase the hydrocracking ability of the catalyst.

The metal promoted ionic liquid or liquid-gel catalyst compositions according to this invention are useful in various slurry phase hydroprocessing reactions, such as for catalytic hydrocracking/hydrogenation of carbonaceous feed materials including coal, heavy petroleum resids, lignin and plastic waste materials for producing desirable low-boiling value-added hydrocarbon distillate liquid products. Because of the high activity of these iron-based and metal promoted ionic liquid or liquid-gel catalysts, they can be used in small concentrations of 0.05–2.0 wt. % iron relative to weight of feed for the various hydrogenation and hydroconversion reactions mentioned above, and the catalyst is preferably recycled with any unconverted or partially converted high boiling fraction (454° C.+) back to the reactor or reactors for further hydrocracking/hydrogenation reactions. Because these highly dispersed iron-based ionic liquid or liquid-gel catalysts are produced from available relatively inexpensive materials and the principal component is environmentally benign iron, the catalysts are usually disposable for large scale hydrocracking/hydrogenation processes.

This invention advantageously provides the iron-based ionic liquid or liquid-gel catalyst compositions having high catalytic activity and pH of 0.1–3.0. The liquid or liquid-gel catalysts which may be molybdenum promoted are easily produced and inexpensive, because significant precipitation of iron particles with ammonium hydroxide addition is not required. The catalysts are useful as an expendable slurry type catalyst in processes for catalytic hydrocracking and hydroconversion of carbonaceous feed materials such as coal, heavy petroleum resids, plastic wastes, and mixtures thereof for producing the desirable low boiling hydrocarbon liquid and gaseous products. This catalyst in either its liquid form or liquid-gel form is fluidic and flowable, and is readily mixable with the hydrocarbon feedstream or can be injected directly into one or both of the pressurized reactors. This invention also includes method steps for making the iron-based ionic liquid or liquid-gel catalysts, and also includes catalytic hydrocarbon hydrocracking/hydrogenation processes utilizing the liquid or liquid-gel catalysts to produce the desired low-boiling hydrocarbon liquid products.

BRIEF DESCRIPTION OF DRAWINGS

The process for making and utilizing the ionic liquid or liquid-gel catalyst of this invention will be described further with reference to the following drawings, in which.

DESCRIPTION OF INVENTION

The iron-based ionic liquid or liquid-gel catalysts compositions according to this invention include hydroxides and oxyhydroxides of iron, combined with anions such as sulfate ($SO_4^{2-}$), and promoted by small amounts of an active metal such as preferably molybdenum (Mo), which acts as an active hydrogenation metal in the either the catalyst liquid form or the liquid-gel containing fine-sized iron precipitates characterized as being dispersed submicroscopic crystalline particle groups. The catalyst broad range compositions include 5–20 wt. % iron and 0.05–2.0 wt. % of at least one promotor metal such as preferably molybdendum with the remainder being water. The catalyst is preferably made and utilized in its ionic liquid form, but may also be produced and used as the liquid-gel form containing very fine submicroscopic iron particles in 60–95 wt. % water.

Figure 1:
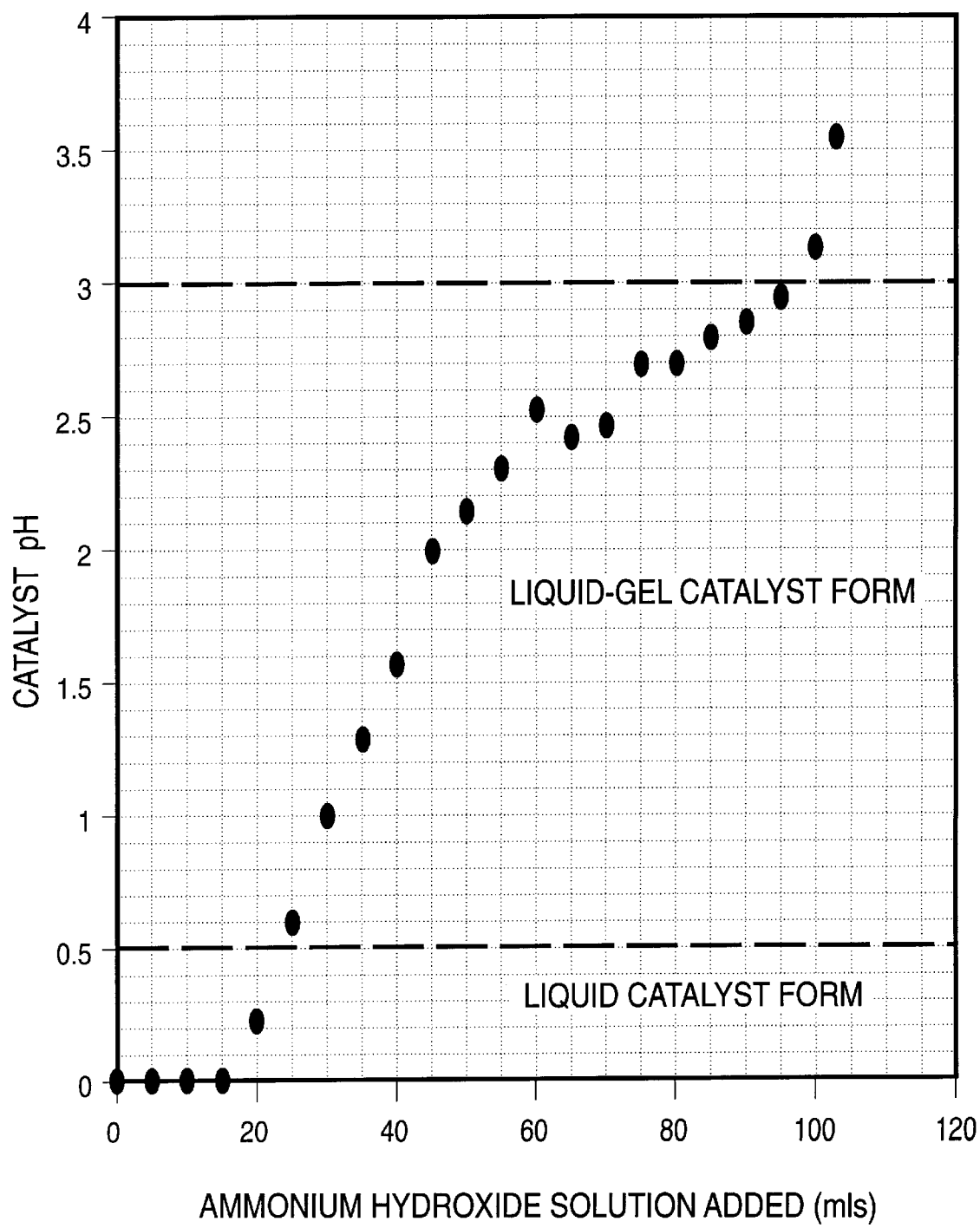
FIG. 1 is a general titration curve for an aqueous solution of an iron-based salt such as iron sulfate showing the relation between catalyst pH value and amount of ammonium hydroxide solution added to the iron sulfate salt solution during making of the liquid or liquid-gel catalysts of this invention;.

The general relationship between the liquid and the liquid-gel forms of the iron-based catalyst of this invention is shown by FIG. 1 for an iron sulfate solution. It is seen that for only minimal amounts of the ammonium hydroxide addition to the aqueous iron salt solution, the pH remains essentially zero, no submicroscopic particles of the iron are formed, and the catalyst remains in a liquid form. But as more ammonium hydroxide is added to the iron salt solution, the pH increases and the solution color changes from brown to dark red as iron submicroscopic particles increasingly occur. The useful pH range for the ionic liquid catalyst form is between about 0.1 and about 0.5. The catalyst liquid-gel form of the catalyst has a pH value between about 0.5 and 3.0. The ionic liquid form of the catalyst having low pH below about 0.5 without any appreciable addition of ammonium hydroxide is preferred, because it can be mixed more easily and effectively with the hydrocarbon feedstreams.

The catalyst liquid or liquid-gel forms reduce the catalyst cost significantly as compared to a former gel or dried particulate catalyst forms, and also maintains its high activity for comparable catalytic hydroprocessing reactions. The preferred ionic liquid catalyst compositions contain 8–16 wt % iron, 0.10–1.5 wt % molybdenum, and 0.5–1.5 wt. % phosphoric acid with the remainder being water. The metals loading broad range for catalytic hydroprocessing applications is 500–15,000 wppm iron and 10–500 wppm molybdenum relative to the carbonaceous feed material. Preferred metal loadings in such hydroprocessing reactions are 800–10,000 wppm iron and 50–250 wppm molybdenum relative to the feed material, with the phosphorus ranges being substantially the same as molybdenum.

The iron-based ionic liquid or liquid-gel catalysts of this invention are environmentally benign and cost-effective because the principal component is iron. These catalysts have been shown to be very effective for hydrocracking and hydrogenation of high molecular weight hydrocarbon feeds including fossil fuels such as coals and heavy petroleum residua. The catalysts of this invention have been successfully tested at 1000 cc autoclave reactor scale at operating temperatures of between 400 to 460° C. (750–860° F.) and under hydrogen pressures of 5–20 MPa, (735–2920 psig). The iron-based catalysts have been utilized in small loadings relative to feed (0.05 to 1.5 wt. % iron) so that they can be used on a once-through basis in commercial hydroprocessing operations. By using the ionic liquid or liquid-gel catalysts of this invention alone, and also in combination with other catalyst precursors, excellent process performances have been obtained for hydrocracking/hydroconversion of carbonaceous feed materials to produce liquid and gaseous products during hydroprocessing of the different types of feed materials including coal and petroleum resid.

The catalyst in either the liquid or liquid-gel form provides the advantage that when added to high temperature hydrogenation reaction systems, the water in the catalyst vaporizes rapidly and helps the iron-based ionic species to be dispersed in the hydrocarbon feed for a more effective catalyst-reactant interaction. The molybdenum-promoted iron-based catalyst of this invention is very useful for hydroconversion of carbonaceous materials at the broad operating conditions of reactor temperatures in the range of 400–460° C. temperature, hydrogen partial pressures between 5–20 MPa, and feed space velocities between 320–1280 kg/h/m$^3$ reactor volume. Useful loadings of the ionic liquid catalysts relative to feed are such that about 500–15,000 wppm of iron and about 10–500 wppm of molybdenum are provided relative to the hydrocarbon feed. Under these conditions and using a two-stage back-mixed reactor configuration, carbonaceous feed conversions of 93–96 wt. % have been obtained with yields of 60–73 wt. % of light distillate liquids. Typically, for the two-stage reactor configuration, with or without an interstage phase separation step, feed conversions of over 92 wt. % have been obtained with yields of over 65 wt % of light distillable liquid products.

The iron-based ionic liquid or liquid-gel catalysts of this invention are highly versatile for use in hydroprocessing of high molecular weight carbonaceous materials besides coal, such as heavy petroleum resid, mixed plastics from municipal solid wastes, biomass, and lignin. The important key to the higher activity of the iron-based ionic liquid or liquid-gel catalysts of this invention as compared with some other iron-based catalysts disclosed in the literature, is the present catalysts being in an initial fine size ionic substantially liquid form and their greater extent of catalytic dispersion in the feedstream.

Catalyst Preparation Methods

The iron-based ionic liquid and liquid-gel catalyst according to this invention can be prepared using any of the various iron salt compounds as listed above. For the preferred Method A, preparation of the catalyst uses 50.3 wt. % of ferric sulfate pentahydrate $Fe_2(SO_4)_3 \cdot 5H_2O$, 48.2 wt. % water, 0.7 wt. % phosphoric acid and 0.8 wt. % ammonium molybdate. The pH of the resulting liquid catalyst is about 0.5. However, for the liquid-gel catalyst form the pH value may be increased up to about 3.0 by addition of 20–28 wt. % hydrogen peroxide solution. The ionic liquid catalyst resulting from the Method A preparation contains about 10 wt. % iron, about 0.3 wt. % molybdenum and phosphorus promotor metal, with the remainder being water, and can be advantageously used in hydrocarbon hydroprocessing reactions without any precipitation or drying steps. If desired to produce a gel form of the catalyst, more 20–28 wt. % ammonium hydroxide ($NH_4OH$) is added at the rate of 10–20 cc/min sufficient to produce iron precipitation until a dark brown gel is formed at a pH of about 4.5, which gel contains 30 wt. % solids which are mostly $Fe(OH)_3$ and FeOOH with sulfate anion modifier, precipitated phosphorus and unhydrolyzed iron salts. Optionally, such a gel catalyst can be dried and calcined at about 520° C. and the resulting solid catalyst can be converted to a fine powder by conventional means which provides a powdered catalyst with a surface area of between 5–250 m$^2$/gm.

For Method B, preparation of the liquid-gel catalyst form uses by weight 41.8% ferric sulfate pentahydrate, 40.1% water, 0.6% phosphoric acid, 0.6% ammonium molybdate and 16.9% ammonium hydroxide, and the resulting pH of the catalyst is about 1.5 and the pH may be increased up to about 3.0 by the addition of sufficient 20–28 wt. % ammonium hydroxide solution. The liquid-gel catalyst, containing dispersed submicroscopic particles of hydrolyzed iron, can be used in various hydrocarbon hydroprocessing reactions. If desired to produce a gel form of the catalyst, further addition of the ammonium hydroxide solution will result in a dark brown gel at pH of about 4.5 as described above.

Whenever the iron-based catalyst is used in the ionic liquid form or the liquid-gel form in hydroprocessing operation, the catalysts prepared by either Method A or Method B need to be premixed with a slurrying oil (recycle solvent in coal liquefaction processes) with effective agitation and mixing before introduction into a catalytic reactor.

Processes Utilizing Dispersed Iron-Based Liquid Catalysts

The highly dispersed iron-based ionic liquid or the liquid-gel catalysts of this invention can be advantageously used in processes for catalytic hydrocracking/hydroconversion of various high molecular weight carbonaceous feed materials, including coal, petroleum residua, plastic wastes, and mixtures thereof to produce desired lower-boiling hydrocarbon liquid products, which include transportation and utility fuels such as fuel oils, diesel, kerosene, gasoline, and other hydrocarbon products. The catalyst of this invention, in either the ionic liquid or the liquid-gel form, should preferably be thoroughly mixed with the hydrocarbon feedstream upstream of the reactor, or the catalyst can be injected directly into the reactor along with a premixed slurrying oil at elevated temperature and pressure conditions. It is necessary that sufficient sulfur be present in the reaction system for the dispersed catalyst metals to be activated in situ by sulfidation. Whenever the carbonaceous feedstream contains insufficient sulfur to provide adequate sulfidation for high catalyst activity, a sulfur-containing compound such as hydrogen sulfide should be added either to the feedstream or directly into the first stage reactor. Usually, the amount of sulfur provided is the reactor amount that gives about 0.05–5 wt. % $H_2S$ in the gas phase effluent hydrogen.

Figure 2:
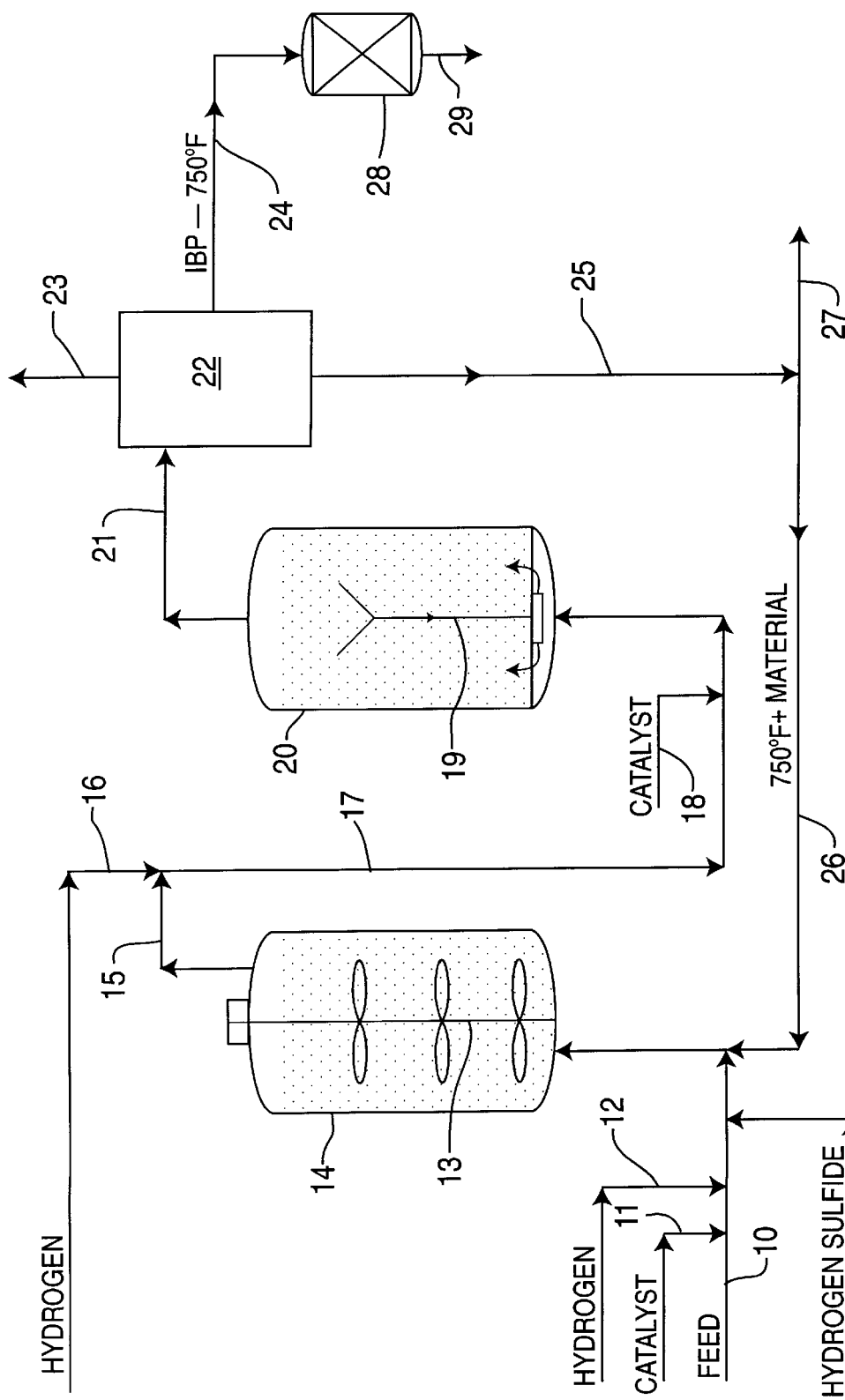
FIG. 2 is a schematic flow diagram of a close-coupled catalytic two-stage hydrocracking/hydrogenation process utilizing highly dispersed iron-based ionic liquid or liquid-gel catalysts in both reactor stages.
Figure 3:
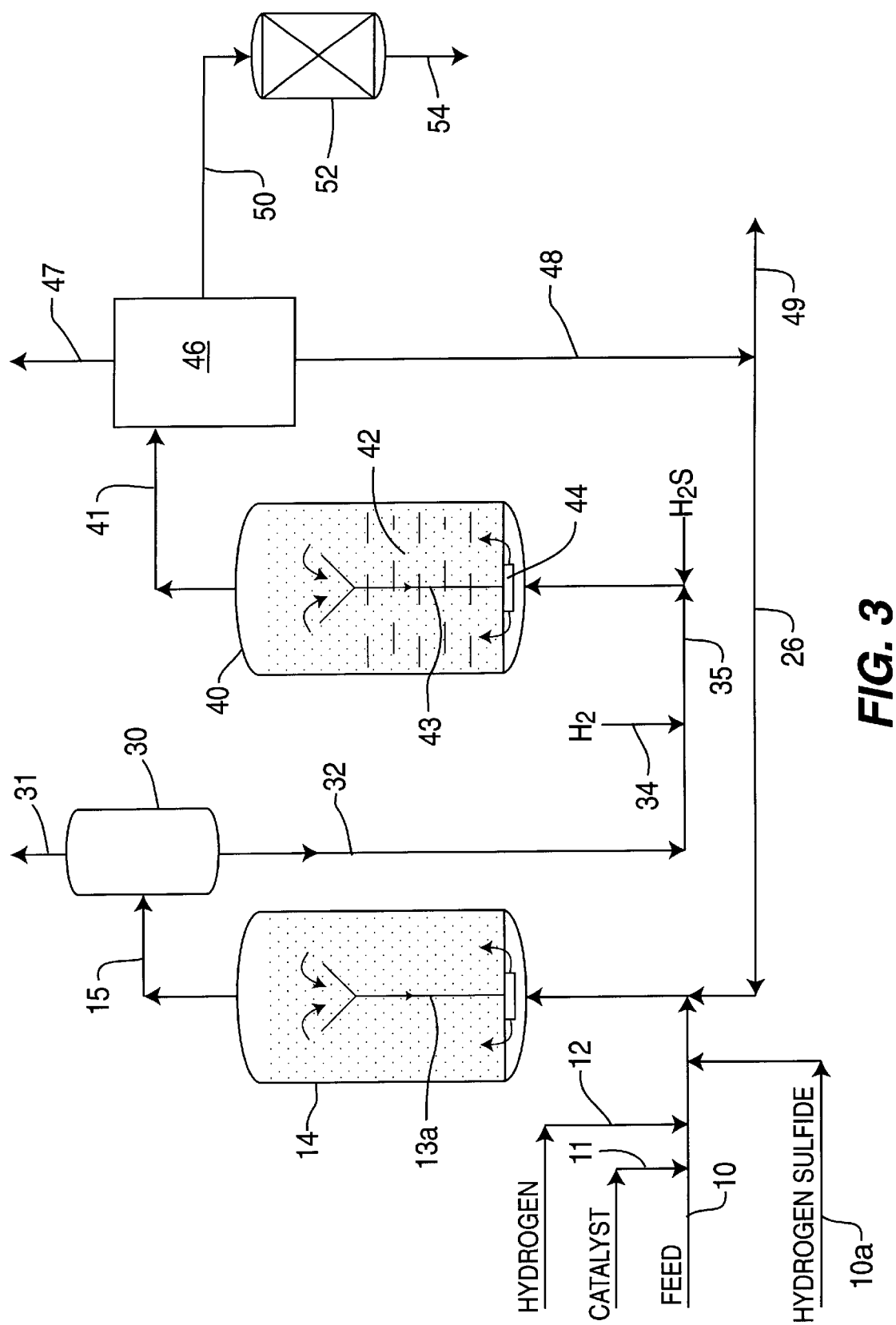
FIG. 3 is a schematic flow diagram similar to FIG. 1, but utilizes an iron-based ionic liquid slurry catalyst in the first stage reactor and a fluidized bed of particulate supported catalyst in the second stage reactor, with interstage separation provided between the two reactors.

Catalytic hydrocracking and hydroconversion processes-utilizing the catalysts of this invention can be performed in a single-stage catalytic reactor, but preferably utilize two-staged catalytic reactors connected in series, either in a close-coupled arrangement as shown by FIG. 2, or preferably with an interstage vapor/liquid separator as shown by FIG. 3. Both the staged catalytic reactors are operated in a continuous back-mixed mode, and the reactor liquid and catalyst is recycled either internally within the reactor or by a flow circuit external to the reactor (not shown) to maintain adequate mixing and catalyst/liquid contact therein. For the two-staged catalytic reactors, different reaction conditions can be maintained in each reactor as may be desirable for achieving best hydroconversion results for a particular hydrocarbon feed material. Both the first and second staged reactors can contain only the highly dispersed ionic liquid or liquid-gel type catalyst, as generally shown in FIG. 2. The two-staged catalytic back-mixed reactors can both be operated at essentially equal temperatures within the broad range of 400–460° C., or the first stage reactor temperature can be either 10–50° C. lower or higher than that of the second stage reactor. However, it is usually preferred for the first stage reactor temperature to be 10–50° C. lower than the second stage reactor temperature. Effluent from the first stage reactor is preferably phase separated to remove vapors and light liquid fractions, before passing the remaining liquid fraction on to the second stage reactor for further catalytic reactions therein.

Alternatively, the ionic liquid or liquid-gel catalyst can be utilized in a hybrid process mode in which one or both of the reactors, preferably the second stage reactor, will contain an expanded catalyst bed of a particulate supported type catalyst such as cobalt-molybdenum or nickel-molybdenum on alumina support extrudates, as generally shown in FIG. 3. For both the FIG. 2 and 3 processes, the liquidic catalyst is added at 11 to the feedstream 10 so as to pass through both reactors and supplement the catalytic activity of the particulate supported type catalyst provided in one or both reactors. Also if desired, the liquidic catalyst can be injected directly into one or both expanded bed reactors. Although reactors can be operated at substantially equal temperatures within the broad range of 400–460° C., it is usually preferred for the first stage reactor temperature to be 10–50° C. lower than the second stage reactor containing the supported type particulate catalyst. The first stage reactor effluent stream is phase separated to form vapor and liquid fractions, and the remaining bottoms liquid fraction is passed to the second stage catalytic reactor, from which the effluent stream is phase separated and then distilled to produce various desired lower-boiling hydrocarbon distillate liquid products. The distillation bottom heavy liquid residue containing some of the dispersed liquid or liquid-gel catalyst is usually recycled back to the first stage reactor for further hydroconversion reactions therein.

As specifically shown in FIG. 2, a carbonaceous feed material such as particulate coal provided at 10 is slurried with a suitable slurrying oil, then pressurized and fed together with the dispersed iron-based liquid or liquid-gel catalyst provided at 11, and hydrogen at 12 upwardly into the first stage reactor 14, where the reacting material is back-mixed and circulated internally by suitable rotary mixing means 13. The preferred reaction conditions are 425–450° C. temperature, 7–17 MPa hydrogen partial pressure, and 400–800 kg/h/m$^3$ reactor space velocity. If needed, a suitable sulfur-containing compound such as hydrogen sulfide can be added at 10 to adequately sulfide the catalyst a to the feedstream 10.

From the first stage reactor 14, partially reacted effluent material at 15 has additional hydrogen added at 16 and additional liquidic catalyst added at 18 as needed, and the effluent stream 17 is passed into second stage reactor 20 in which it is back-mixed by recycle means 19 as described later for further catalytic reactions therein. Preferred operating conditions in the second reactor 20 are 440–460° C. temperature and 7–17 MPa hydrogen partial pressure. An effluent stream is removed at 21 and further processed in a series of high and low pressure gas-liquid separators and distillation steps provided in refining section 22. A product gas stream including light hydrocarbon gases $C_1$–$C_3$ together with $H_2$, CO, $CO_2$, $NH_3$, and $H_2S$ is removed at 23, and the hydrogen fraction is purified and recycled back to the first stage reactor at 12 along with make-up $H_2$ provided at 16 as needed. Hydrocarbon liquid product having a typical boiling range of 28–400° C. is withdrawn at 24. A heavier 400° C.$^+$ liquid or slurry stream 25 which may contain some dispersed catalyst is recycled as stream 26 back to the first stage reactor 14, and a portion of the refractory product and any unreacted solids may be removed as stream 27. If desired, the IBP-400° C. liquid product stream removed at 24 may be passed to an in-line catalytic fixed-bed hydrotreater 28 for improving the quality of the light distillate product which is withdrawn at 29.

An alternative catalytic two-stage hydroconversion process for carbonaceous feeds such as coal is shown in FIG. 3. This FIG. 3 process is similar to that shown in FIG. 2 in that the first stage reactor 14 utilizes the dispersed liquid or liquid-gel catalyst of this invention and is back-mixed by internal recirculation means 13a. However, the first stage reactor effluent at 15 is passed to a high pressure interstage vapor-liquid separator 30, from which a vapor fraction 31 is removed overhead. The remaining liquid/slurry fraction 32 is passed with added hydrogen at 34, and additional sulfur-containing compound at 35 if needed to the second stage reactor 40, which contains an expanded bed 42 of a conventional particulate supported type catalyst. For this FIG. 3 process arrangement for mainly coal feeds, the temperature in first sta ge reactor 14 is preferably 420–450° C. and the temperat ure of the second s tage reactor catalyst bed is preferably 410–430° C. The fine sized dispersed catalyst co ntained in the liquid fraction stream 32 is passed throu gh the expanded particulate catalyst bed 42 in the second stage reactor 40, the bed being expanded by reactor liquid recycled through down-comer conduit 43 and pump 44.

The second stage reactor effluent stream 41 is passed to a product seperation and distillation section 46, which is operated s imilarly as the separation section 22 for the FIG. 2 process. A product gas stream including light $C_1$–$C_3$ gases together with impurities similar to the gas stream 23 is removed at 47, and heavy liquid/slurry stream is withdrawn at 48 which may contain some dispersed catalyst from the first stage reactor 14, and a portion is recycled back to reactor 14 in a similar manner as in the FIG. 2 process. A remaining portion of the slurry stream 48 may be withdrawn at 49. For both processes as shown in FIGS. 2 and 3, the light liquid product stream 50, normally boiling between 27–400° C., may be upgraded in an in-line catalytic fixed-bed hydrotreating reactor 52, so that the resulting improved quality distillate products at 54 have a high hydrogen content and low heteroatom (N,S,O) content.

The iron-based ionic liquid or the liquid-gel catalysts of this invention can also be advantageously used in processes for hydroconversion of petroleum residua feedstocks, and also for hydrocracking of high molecular weight polymeric feed materials such as mixed plastic waste from municipal solid waste streams, such as including p olyethylene, polypropylene, polystyrene, and similar plastic waste materials provided either alone in a co-mingled state, or mixed with coal and/or heavy oils. Useful reaction cond itions for such petroleum residua hydroconversion reactions are 425–450° C. temperature and 7–17 MPa hydro ge n partial pressure. Useful reaction conditions for hydrocracking hydroconversion plastic wastes are similar to those for hydrocracking of coal and heavy petroleum residua.

The iron-based liquid or liquid-gel catalysts of this invention have been successfully utilized in autoclave and continuous flow pilot plant operations in processes of direct coal liquefaction and coal/oil coprocessing with resid upgrading, and significant process performance improvements have been obtained not only for increased residuum conversion and distillate product yields. Also, the present process is less complex operationally because the dispersed liquid or liquid-gel catalyst allows better utilization of the reactor space for the reacting hydrocarbon feed material, and as a result the overall throughput of the process can be improved significantly.

This invention will be described further with the aid of the following Examples, which should not be construed as limiting in scope.

EXAMPLE 1

To determine the performance of the iron-based ionic liquid catalyst of this invention as compared to the previous dispersed iron-oxide catalyst in either gel form or dried solid form, comparison runs were made using a bituminous coal feed blended with a petroleum resid slurrying oil in a 1-liter capacity autoclave hydroconversion unit. The bituminous coal and resid oil feed material had the following characteristics (moisture and ash free basis):

| Coal, wt. % MAF | | Petroleum Resid, wt. % | |
|---|---|---|---|
| Carbon | 75.52 | Carbon | 87.52 |
| Hydrogen | 4.30 | Hydrogen | 9.36 |
| Sulfur | 0.34 | Sulfur | 0.64 |
| Nitrogen | 0.90 | Nitrogen | 0.36 |
| Oxygen, wt. % | 12.95 | Oxygen, wt. % | 12.95 |
| Ash | 5.99 | API | 10 |

The blended coal and resid slurrying oil feed total, catalyst iron relative to the feed, the reaction conditions provided, and results of these autoclave runs are shown in Table 1 as follows:

TABLE 1

Catalyst Performance Comparisons On Coal Oil Feed in Autoclave

| | Former Dried Catalyst | Former Gel-Cat Form | Present Ionic Liquid Catalyst |
|---|---|---|---|
| Coal, wt. % | 21.0 | 21.0 | 21.0 |
| Resid Slurry Oil, wt. % | 79.0 | 79.0 | 79.0 |
| Iron in Feed, wppm | 5000 | 5000 | 5000 |
| Reaction Temp, ° C. | 400 | 400 | 400 |
| $H_2$ Pressure, psig | 2500 | 2500 | 2500 |
| Time at temp., min | 40 | 40 | 40 |
| Coal Conversion, wt. % | 82 | 89 | 89 |
| Resid Conversion, wt. % | 19 | 20 | 28 |

Based on the above results, it is seen that the coal and resid oil conversion percentages for the present ionic liquid catalyst are equal to or significantly better than for the prior dried powder or gel forms of the iron-based catalyst.

EXAMPLE 2

Further catalyst performance comparisons were made using the same bituminous coal as for Example 1, but with a coal-derived resid slurrying oil feeds in two-stage catalytic slurry bed reactors at an average hourly feed rate of about 13 lbs/hr.ft$^3$ reactor. The comparison was between a former gel form of an iron-based catalyst containing iron precipitates and the present iron-based ionic liquid catalyst. The coal and oil feeds, catalyst concentrations, reaction conditions and the results for the catalytic conversions to distillate and resid fraction products are presented in Table 2 below.

TABLE 2

Catalyst Performance Comparison For Coal Feed In Two-Stage Slurry Bed Reactors

| | Former Gel Form Catalyst | Present Liquid Catalyst |
|---|---|---|
| Feed, wt % MAF | | |
| Coal | 40.5 | 41.9 |
| Resid Slurry Oil | 57.2 | 56.0 |
| Catalyst | 2.3 | 2.1 |
| Iron in Feed, wppm | 5000 | 5000 |
| Reaction Conditions | | |
| Temp. Reactor No.1, ° C. | 440 | 440 |
| Temp. Reactor No.2, ° C. | 450 | 450 |
| $H_2$ Pressure, psig | 2500 | 2500 |
| Space Velocity, lb/hr/ft$^3$ | 12.97 | 14.75 |
| Conversions, wt. % MAF | | |
| Coal | 92.2 | 93.3 |
| 524° C.$^+$ Resid | 85.2 | 88.1 |
| Product Yields, wt. % | | |
| $C_4$-524° C. Distillate | 65.4 | 67.5 |
| 524C$^+$ Resid | 14.5 | 11.9 |

Based on the above results, it is seen that for the present liquid catalyst form the percentage coal and resid conversions were increased, while the $C_4$-524° C. distillate fraction yield was also significantly increased and the 524° C.+ resid fraction was desirably reduced.

Although this invention has been disclosed broadly and in terms of preferred embodiments, it will be understood that modifications and variations can be made to the catalyst composition and to the hydrogenation processes utilizing the catalyst, all within the scope as defined by the claims.

We claim:

1. An iron-based ionic liquid catalyst composed of 5–20 wt. % iron and promoted with 0.05–2.0 wt. % of at least one active promotor metal including cobalt, molybdenum, palladium, platinum, nickel or tungsten or combination thereof with the remainder being water, the catalyst having a pH in the range of 0.1–3.0.

2. The catalyst material of claim 1, wherein the catalyst contain 8–16 wt. % iron and 0.1–1.5 wt. % molybdenum, with the remainder being water.

3. The catalyst material of claim 1, wherein the catalyst has the form of a liquid-gel containing at least part of the iron as dispersed submicroscopic particle groups, said groups being formed by the addition of small amount of ammonium hydroxide to an iron salt solution with the remainder being water.

4. The catalyst of claim 1, wherein the pH of the iron-based ionic liquid catalyst is from 0.1 to 0.5.

5. The catalyst of claim 3, wherein the pH of the iron-based liquid-gel is from about 0.5 to 3.0.

6. The catalyst of claim 1, wherein between 0.2–2.0 wt. % phosphoric acid is included in an iron salt solution of the catalyst.

7. The catalyst of claim 3, wherein between 0.2–2.0 wt % phosphoric acid is included in an iron salt solution of the catalyst.

8. An iron-based ionic liquid catalyst composed of 5–20 wt % iron and promoted with addition of 0.05–2.0 wt. % molybdenum and 0.2–2.0 wt. % phosphoric acid with the remainder being water, the pH being from about 0.1 to 0.5.

9. A method for making an iron-based ionic liquid form catalyst in an aqueous solution containing iron and a promotor metal, the method comprising dissolving an iron salt and a promotor metal salt to provide an aqueous solution, said solution containing 5–20 wt % iron and 0.05–2.0 wt % of said promotor metal and having a pH at least 0.1.

10. The catalyst making method of claim 9, wherein the iron source is ferric sulfate pentahydrate, and the promotor metal salt source is ammonium heptamolybdate.

11. The catalyst making method of claim 9, wherein 0.2–2.0 wt. % phosphoric acid is added to said aqueous solution for increasing the catalyst cracking activity.

12. The catalyst making method of claim 9, wherein sufficient ammonium hydroxide is added to said aqueous solution to provide a pH of 0.5 to 3.0 and form at least part of the iron as dispersed submicroscopic particle groups to form a liquid-gel catalyst.

13. A method for making an iron-based ionic liquid catalyst in an aqueous solution containing iron and a promoter metal salt, the method comprising the steps of dissolving an iron salt ferric sulfate pentahydrate and promotor salt ammonium heptamolybdate to provide an aqueous solution, said solution containing 5–20 wt % iron and 0.05–2.0 wt % of said metal promotor and having a pH of 0.1 to 0.5.

14. A catalytic process for hydrocracking/hydrogenation of high molecular weight carbonaceous feed materials for producing lower boiling hydrocarbon liquid products, the process comprising:

(a) reacting a carbonaceous feed material with an iron-based, anion-modified ionic liquid catalyst as defined by claim 1, under reaction conditions of 400–460° C. (750–860° F.) temperature, 5–20 MPa (735–2950 psig) hydrogen partial pressure, 320–1280 kg/h/m$^3$ reactor (20–80 lb/h/ft$^3$ reactor ) space velocity, and catalyst loading of 500–15,000 wppm iron relative to the feed and in the presence of sufficient sulfur to sulfide the catalyst and producing a reactor effluent containing vapor and liquid fractions; and (b) phase separating the reactor effluent into said vapor and liquid fractions, distilling the liquid fraction, and withdrawing low-boiling hydrocarbon liquid products.

15. A catalytic hydrocracking/hydrogenation process according to claim 14, wherein the carbonaceous feed material is coal and the reaction conditions are 425–450° C. temperature, 7–17 MPa hydrogen partial pressure, and space velocity of 400–800 kg/h/m$^3$ reactor volume.

16. A catalytic hydrocracking/hydrogenation process according to claim 14, wherein the feed material is heavy petroleum resid.

17. A catalytic hydrocracking/hydrogenation process according to claim 14, wherein the feed material is a mixture of coal and heavy petroleum resid.

18. A catalytic hydrocracking/hydrogenatiion process according to claim 14, wherein the feed material is coal and co-mingled plastic waste.

19. A catalytic hydrocracking/hydrogenation process according to claim 14, wherein the feed material is a mixture of heavy petroleum residua and co-mingled plastic waste.

20. A catalytic hydrocracking/hydrogenation process according to claim 14, wherein the feed material reacted in two-stage close-coupled catalytic reactors connected in series.

21. A catalytic hydrocracking/hydrogenation process according to claim 14, wherein the feed material is reacted in two-stage catalytic reactors connected in series, with an interstage vapor-liquid phase separation step being provided between said two reactors.

22. A catalytic hydrocracking/hydrogenation process according to claim 20, wherein the first stage reactor contains said iron oxide-based ionic liquid catalyst, and the second stage reactor contains an expanded bed of a supported particulate type catalyst.

23. A catalytic hydrocracking/hydrogenation process according to claim 20, wherein the first stage reactor temperature is 10–50° C. lower than that of the second stage reactor.

24. A catalytic hydrocracking/hydrocracking/hydrogenation process according to claim 20, wherein the first stage reactor temperature is 10–50° C. higher than that of the second stage reactor.

25. A catalytic hydrocracking/hydrogenation process according to claim 20, wherein each said catalytic reactor contains an expanded bed of particulate supported catalyst, and said iron-based ionic liquid or liquid-gel catalyst is added to the feedstream or directly to at least one said reactor.

26. A catalytic hydrocracking/hydrogenation process according to claim 14, including upgrading an IBP-400° C. liquid fraction of said hydrocarbon liquid product in an in-line catalytic fixed-bed hydrotreating step to provide an improved quality light distillate product.

* * * * *

UNITED STATES PATENT AND TRADEMARK OFFICE
CERTIFICATE OF CORRECTION

PATENT NO. : 6,139,723
DATED : October 31, 2000
INVENTOR(S) : Bruce P. Pelrine, Alfred G. Comolli and Lap-Keung Lee It is certified that error appears in the above-identified patent and that said Letters Patent is hereby corrected as shown below:

<u>Column 5,</u>
Line 51, the words "hydrogen peroxide" should read -- ammonium hydroxide --

Signed and Sealed this

Eighth Day of April, 2003

JAMES E. ROGAN
*Director of the United States Patent and Trademark Office*